United States Patent Office 2,847,385
Patented Aug. 12, 1958

2,847,385
DETERGENT-SOIL SUSPENDING COMPOSITION CONTAINING CARBOXYMETHYL DEXTRAN

Malvern J. Hiler, Dayton, Ohio, assignor to The Commonwealth Engineering Company of Ohio, Dayton, Ohio, a corporation of Ohio No Drawing. Application October 7, 1954
Serial No. 461,005

20 Claims. (Cl. 252—152)

This invention relates to detergent compositions. More particularly, it relates to detergent compositions comprising a detergent and a soil suspending agent which is a carboxymethyl dextran.

The object of the invention is to incorporate, with detergents or surface active agents of various kinds and of both anionic and non-ionic types, a soil suspending agent in which dirt eliminated by the detergent, in laundering clothes, etc. is suspended, prevented from redepositing on the articles being washed, and carried away with the suspending agent in the wash water.

It is found, in accordance with the invention, that carboxymethyl dextran is a very effective soil suspending agent for combination with detergents.

The carboxymethyl dextran may be obtained by acting on the selected dextran with a carboxymethylating agent in an aqueous alkaline medium, whereby the carboxymethyl group is substituted for one or more hydroxyl groups in the dextran molecule, with production of an ether. Suitable carboxymethylating agents are chloracetic acid, sodium chloracetate or chloracetamide. The reaction thereof with the dextran is carried out in an aqueous solution of a strong alkali metal hydroxide such as sodium, potassium or lithium hydroxide. Preferably, the dextran is treated, in aqueous solution or suspension, with an excess of sodium or potassium chloracetate in the presence of an excess of sodium or potassium hydroxide at a temperature of 50° C. to 100° C. for a time ranging from about ten minutes to two hours. Preferably, also, the molar ratio of sodium chloracetate or potassium chloracetate to dextran is between 2:1 and 12:1, the molar ratio of sodium or potassium hydroxide to dextran is between 5:1 and 15:1, and the molar ratio of the water to dextran is between 70:1 and 120:1. The ethers obtained have a D. S. (degree of substitution or average number of carboxymethyl groups per anhydroglucopyranosidic unit) of about 0.2 to 3.0.

The reaction product is a viscous mass comprising the sodium or potassium salt of the dextran ether, from which the salt may be precipitated by means of a water-miscible alcohol, e. g., methyl, ethyl, propyl, isopropyl or t.-butyl or a ketone such as acetone.

The free ether may be recovered from the salt by mixing the latter with water, acidifying to a pH of about 2.0, and precipitating the carboxymethyl dextran from the acid medium by addition of an aliphatic water-miscible alcohol or ketone. Precipitation of the ether at pH 2.0 is not critical, as other acid pH values may be used, but the highest yields of the ether have been obtained by precipitation at pH 2.0.

The dextran reacted with the carboxymethyl agent may be obtained in various ways. It may be biosynthesized from sucrose by microorganisms of the *Leuconostoc mesenteroides* and *L. dextranicum* types, or their enzymes. Microorganisms (or their enzyymes) which may be used include those bearing the following NRRL (Northern Regional Research Laboratory) designations: *Leuconostoc mesenteroides* B–512, B–119, B–1146, B–1190, B–742, B–1191, B–1196, B–1208, B–1216, B–1120, B–1144, B–523: *Streptobacterium dextranicum* B–1254 and *Betabacterium vermiforme* B–1139.

The procedure is to inoculate the culture of the microorganism, or the enzyme filtered from the culture into an aqueous sucrose-bearing nutrient medium, incubate the mass until the dextran is produced in maximum yield, and precipitate the dextran from the fermentate by the addition of a water-miscible aliphatic alcohol or ketone to it. The dextran thus obtained is reduced to a fine powder for conversion to the carboxymethyl ether. This "native" dextran normally has a very high molecular weight which has been calculated to be in the millions. It may be converted to the ether at the native high molecular weight or after partial hydrolysis to a product of lower molecular weight. In general, the dextran may have a molecular weight of 5000 to $150 \times 10^6$ determined by light scattering measurements.

The carboxymethyl dextran may be combined as soil suspending agent with a wide variety of detergents. The detergent may be of the "soapless" type and may be an aliphatic or substituted aromatic polar-nonpolar compound containing, in the nonpolar portion of the molecule, one or more free or neutralized inorganic oxygen acid groups derived from polybasic acids, such as sulfuric acid ($-OSO_3H$) or sulfonic acid ($-SO_3H$) groups, and which contain preferably, alkyl groups of 12 to 18 carbon atoms.

The detergent may be an alkyl mono-nuclear aryl sulfonate in which the alkyl group contains at least 10 carbon atoms, usually 10 to 18 carbon atoms, and is directly linked to the aromatic nucleus, i. e., the alkyl group is a nuclear substituent, or is linked to the aromatic nucleus by an oxygen or nitrogen atom, e. g., lauryl benzene sodium sulfonate, tetradecyl benzene sodium sulfonate, cetyl benzene sodium sulfonate, lauryl phenol sodium sulfonate, cetyl phenol sodium sulfonate, myristyl phenol sodium sulfonate, lauryl acetylamino benzene sodium sulfonate, cetyloxy methyl benzene sodium sulfonate (cetyl ether of cresol sodium sulfonate), and mixtures of sodium salts of alkyl benzene sulfonic acids in which the alkyl groups contain mostly 10 to 18 carbon atoms and are derived from petroleum hydrocarbons.

Or the detergent may be a monoalkyl sulfate containing at least 10 carbon atoms in the alkyl group, e. g., ammonium decyl sulfate, sodium lauryl sulfate, sodium cetyl sulfate, sodium myristyl sulfate, sodium stearyl sulfate and magnesium lauryl sulfate.

The detergent may also be a monoalkyl sulfonate containing at least 10, usually 10 to 18 carbon atoms in the alkyl group, e. g., sodium cetyl sulfonate and ammonium lauryl sulfonate.

The carboxymethyl dextran may also be combined as soil suspending agent with detergents which are mono-alkyl carboxylic esters of sulfonated fatty acids containing at least 10, usually 10 to 18 carbon atoms in the alkyl group, such as sodium lauryl sulfoacetate and sodium cetyl sulfoacetate, as well as detergents which are alkyl aminoalkylene and higher fatty acylamino alkylene sulfates and sulfonates containing at least 10, usually 10 to 18 carbon atoms in the alkylamino- and acylamino-groups, and including sodium N-lauryl taurine, sodium N-cetyl taurine, sodium palmitoyl tauride, sodium N-methyl-N-oleyl tauride, and sodium N-lauryl sulfoacetamide. Alkyl esters of sulfo-succinic acids containing at least 10 and up to about 18 carbon atoms in the alkyl group, such as disodium mono-lauryl sulfo-succinic, and disodium monomyristyl alphamethyl sulfosuccinate may also be used as the detergent in combination with the carboxymethyl dextran.

The proportion of carboxymethyl dextran mixed with the detergent may be varied but usually relatively small amounts thereof between 0.1% and 5.0% on the total weight of the ether and detergent are satisfactory. The carboxymethyl dextran has the effect of increasing the viscosity of aqueous media containing it and, therefore, it usually is desirable to use the ether in the smaller amounts such that the proportion of carboxymethyl dextran to detergent is 1:25 to 1:50, the small amounts being effective for holding dirt liberated by the detergent in suspension until it can be rinsed away, thus eliminating the problem of soil re-deposition on the materials being cleaned.

The carboxymethyl dextran may be mixed with the detergent in any suitable way. The dry powdered carboxymethyl dextran may be ground or milled with the dry detergent. Mixtures of aqueous solutions of the carboxymethyl dextran and of the detergent may be prepared and may be used directly or dried in conventional manner, as by spray drying, pan drying or rotary drum drying at suitable temperatures such as 50° C. to 150° C., and under atmospheric or sub-atmospheric pressure. The dry mixtures may be readily stored and introduced as such into wash water to provide detergent baths. The mixtures may also be formed into shaped products such as bars or cakes, in which case the carboxymethyl dextran also serves as a binding agent for the detergent.

It will be understood that two or more detergents may be mixed with the carboxymethyl dextran, and that more than one carboxymethyl dextran may be used in the mixtures to obtain different effects, for example, carboxymethyl ethers of dextrans biosynthesized by different microorganisms and having different degrees of substitution with respect to carboxymethyl groups.

The compositions comprising soapless detergents of the type enumerated herein and carboxymethyl dextran may be used for various purposes, for instance as cleaning and washing compositions for textile fibers, leather, wood, metals, etc., as cosmetics and especially in the cleaning and washing of textile materials, being particularly adapted to surface washing of textiles by sponging with foaming solutions as in cleaning carpets, pile fabrics and the like. The detergent-carboxymethyl dextran mixtures have other uses than in the washing of textiles and the like and may be used in preparing aqueous compositions for cleaning in the form of vasenols, shampoos, creams, metal and shoe polishes and the like. The carboxymethyl dextran is resistant to bacterial attack and since some of the soapless detergents, such as the higher alkyl phenol sulfonates, have bactericidal properties, mixtures of the carboxymethyl dextran and those detergents are particularly suitable for use in cosmetic preparations.

The carboxymethyl dextran is primarily of importance in these mixtures as a soil suspending agent. However, the carboxymethyl dextran has the further effect of improving both the dispersing property and the detergent property of the soapless detergents with which it is combined.

The carboxymethyl dextran may, as stated, contain an average of 0.2 to 3.0 carboxymethyl groups per AGU of the dextran. However, the more highly substituted ethers may be preferred, such as those containing an average of 2.0 to 3.0 carboxymethyl groups per AGU. A presently specifically preferred carboxymethyl dextran is that derived from a native high molecular weight microbiologically produced water-soluble dextran, such as native *L. m.* B–512 dextran containing an average of 2.8 carboxymethyl groups per AGU.

The soapless detergents mentioned are generally used in the form of their sodium, potassium or ammonium salts. If the presence of metals as cations or in colloidal form is desired, the particular metal salt of the detergent is used, for example, the calcium, magnesium or aluminum salt may be used. The detergent may also be in the form of a salt thereof with an organic base such as triethanolamine, quinine, nicotine, polyaminoalkylolamines, amylamines and the like.

The following examples illustrate specific embodiments of the invention, it being understood that these examples are not intended as limitative.

*Example I*

Three parts of carboxymethyl dextran (derived from *L. m.* B–512 native dextran; D. S. 2.8) are mixed and ground with 97 parts of a mixture of sodium monoalkyl phenol sulfonates in which the substituent alkyl groups are attached to carbon atoms of the aryl nuclei and have an average content of about 14 carbon atoms. Two parts of this composition in 1000 parts of water provide an improved detergent composition which may be used, for instance, for cleaning rugs by the shampoo method.

*Example II*

Two parts of carboxymethyl dextran (derived from hydrolyzed *L. m.* B–512 dextran of average M. W. 60,000 to 80,000; D. S. 1.5) and 98 parts of the detergent "Gardinol WA" (chiefly a mixture of cetyl sodium sulfate, lauryl sodium sulfate, and myristyl sodium sulfate) are mixed together and one part of the mixture is dissolved in 500 parts of water to obtain an effective detergent and soil suspending combination.

*Example III*

Five parts of carboxymethyl dextran (derived from high molecular weight, native, water-soluble *streptobacterium dextranicum* 1254 dextran; D. S. 2.5) are ground with 95 parts of the sodium salts of mixed monalkyl benzene sulfonic acids in which the alkyl groups mostly correspond with petroleum hydrocarbons of average carbon content $C_{12}$ to $C_{18}$ (produced by chlorinating a kerosene fraction of petroleum distillate of boiling range corresponding with hydrocarbons ranging mainly from $C_{12}H_{24}$ to $C_{18}H_{38}$, condensing the resulting mixed alkyl chlorides with benzene and with an aluminum chloride condensing agent and sulfonating the resulting mixture of alkyl benzenes). One part of the mixture in 500 parts of water provides an efficient cleansing and soil suspending composition.

Mixtures of the carboxymethyl dextran and other soapless detergents disclosed herein are equally as effective as the combination described in Examples I to III when the dextran is present in an amount of 0.1% to 5.0% on the combined weights. The term "soapless detergent" as used herein includes all of the different detergents specified above and synthetic detergents generally.

Soft water can be used for washing and fulling woolen goods, scouring raw wool, degumming silk, washing and lubricating vegetable, artificial and synthetic fibers and fabrics, washing in household and powder laundries and washing, cleaning and shampooing carpets, rugs, pile fabrics, etc.

The carboxymethyl dextrans as a group are compatible with the detergents and very effective soil suspending agents, acting to hold the soil released from the material being washed, shampooed, etc., by the detergent in suspension so that it is not redeposited on the material.

Since some changes and variations may be made in the details in carrying out the invention without departing from its spirit and scope, it is to be understood that it is not intended to limit the invention except as defined in the appended claims.

What is claimed is:

1. A detergent-soil suspending composition consisting essentially of a synthetic soapless detergent selected from the group consisting of anionic and non-ionic detergents and carboxymethyl dextran containing an average of 0.2 to 3.0 carboxymethyl groups per anhydroglucose unit in an amount of from 0.1% to 5.0% on the combined weights of the detergent and carboxymethyl dextran.

2. A detergent-soil suspending composition consisting essentially of a detergent which is an alkyl mononuclear aromatic sulfonate containing at least 10 carbon atoms in the alkyl group and carboxymethyl dextran containing an average of 0.2 to 3.0 carboxymethyl groups per anhydroglucose unit in an amount of from 0.1% to 5.0% on the combined weights of the sulfonate and carboxymethyl dextran.

3. A detergent-soil suspending composition consisting essentially of a monoalkyl sulfate containing at least 10 carbon atoms in the alkyl group and carboxymethyl dextran containing an average of 0.2 to 3.0 carboxymethyl groups per anhydroglucose unit in an amount of 0.1% to 5.0% on the combined weights of the sulfate and carboxymethyl dextran.

4. A detergent-soil suspending composition consisting essentially of a monoalkyl sulfonate containing at least 10 carbon atoms in the alkyl group and carboxymethyl dextran containing an average of 0.2 to 3.0 carboxymethyl groups per anhydroglucose unit in an amount of 0.1% to 5.0% on the combined weights of the sulfonate and carboxymethyl dextran.

5. A detergent-soil suspending composition consisting essentially of a monoalkyl carboxylic ester of a sulfonated fatty acid containing at least 10 carbon atoms in the alkyl group and carboxymethyl dextran containing an average of 0.2 to 3.0 carboxymethyl groups per anhydroglucose unit in an amount of 0.1% to 5.0% on the combined weights of the ester and carboxymethyl dextran.

6. A detergent-soil suspending composition consisting essentially of an alkylamino-alkylene sulfate containing at least 10 carbon atoms in the alkyl group and carboxymethyl dextran containing an average of 0.2 to 3.0 carboxymethyl groups per anhydroglucose unit in an amount of 0.1% to 5.0% on the combined weights of the sulfate and carboxymethyl dextran.

7. A detergent-soil suspending composition consisting essentially of an acylamino-alkylene sulfate containing at least 10 carbon atoms in the acyl group and carboxymethyl dextran containing an average of 0.2 to 3.0 carboxymethyl groups per anhydroglucose unit in an amount of 0.1% to 5.0% on the combined weights of the sulfate and carboxymethyl dextran.

8. A detergent-soil suspending composition consisting essentially of an alkylamino-alkylene sulfonate containing at least 10 carbon atoms in the alkyl group and carboxymethyl dextran containing an average of 0.2 to 3.0 carboxymethyl groups per anhydroglucose unit in an amount of 0.1% to 5.0% on the combined weights of the sulfonate and carboxymethyl dextran.

9. A detergent-soil suspending composition consisting essentially of an acylamino-alkylene sulfonate containing at least 10 carbon atoms in the acyl group and carboxymethyl dextran containing an average of 0.2 to 3.0 carboxymethyl groups per anhydroglucose unit in an amount of 0.1% to 5.0% on the combined weights of the sulfonate and carboxymethyl dextran.

10. A detergent-soil suspending composition consisting essentially of an alkyl ester of sulfo-succinic acid containing at least 10 carbon atoms in the alkyl group and carboxymethyl dextran containing an average of 0.2 to 3.0 carboxymethyl groups per anhydroglucose unit in an amount of 0.1% to 5.0% on the combined weights of the salt and carboxymethyl dextran.

11. A detergent-soil suspending composition consisting essentially of an alkyl mono-nuclear aromatic sulfonate containing at least 10 carbon atoms in the alkyl group and from 0.1% to 5.0% on the composition weight of carboxymethyl dextran derived from native, high molecular weight, microbiologically produced dextran and containing an average of 2.0 to 3.0 carboxymethyl groups per anhydroglucopyranosidic unit of the dextran.

12. A detergent-soil suspending composition consisting essentially of a monoalkyl sulfate containing at least 10 carbon atoms in the alkyl group and from 0.1% to 5.0% on the composition weight of carboxymethyl dextran derived from native, high molecular weight, microbiologically produced dextran and containing an average of 2.0 to 3.0 carboxymethyl groups per anhydroglucopyranosidic unit of the dextran.

13. A detergent-soil suspending composition consisting essentially of a monoalkyl sulfonate containing at least 10 carbon atoms in the alkyl group and from 0.1% to 5.0% on the composition weight of carboxymethyl dextran derived from native, high molecular weight, microbiologically produced dextran and containing an average of 2.0 to 3.0 carboxymethyl groups per anhydroglucopyranosidic unit of the dextran.

14. A detergent-soil suspending composition consisting essentially of a monoalkyl carboxylic ester of a sulfonated fatty acid containing at least 10 carbon atoms in the alkyl group and from 0.1% to 5.0% on the composition weight of carboxymethyl dextran derived from native, high molecular weight, microbiologically produced dextran and containing an average of 2.0 to 3.0 carboxymethyl groups per anhydroglucopyranosidic unit of the dextran.

15. A detergent-soil suspending composition consisting essentially of an alkylamino-alkylene sulfate containing at least 10 carbon atoms in the alkyl group and from 0.1% to 5.0% on the composition weight of carboxymethyl dextran derived from native, high molecular weight, microbiologically produced dextran and containing an average of 2.0 to 3.0 carboxymethyl groups per anhydroglucopyranosidic unit of the dextran.

16. A detergent-soil suspending composition consisting essentially of an acylamino-alkylene sulfate containing at least 10 carbon atoms in the acyl group and from 0.1% to 5.0% on the composition weight of carboxymethyl dextran derived from native, high molecular weight, microbiologically produced dextran and containing an average of 2.0 to 3.0 carboxymethyl groups per anhydroglucopyranosidic unit of the dextran.

17. A detergent-soil suspending composition consisting essentially of an alkylamino-alkylene sulfonate containing at least 10 carbon atoms in the alkyl group and from 0.1% to 5.0% on the composition weight of carboxymethyl dextran derived from native, high molecular weight, microbiologically produced dextran and containing an average of 2.0 to 3.0 carboxymethyl groups per anhydroglucopyranosidic unit of the dextran.

18. A detergent-soil suspending composition consisting essentially of an acylamino-alkylene sulfate containing at least 10 carbon atoms in the acyl group and from 0.1% to 5.0% on the composition weight of carboxymethyl dextran derived from native, high molecular weight, microbiologically produced dextran and containing an average of 2.0 to 3.0 carboxymethyl groups per anhydroglucopyranosidic unit of the dextran.

19. A detergent-soil suspending composition consisting essentially of an alkyl ester of sulfo-succinic acid containing at least 10 carbon atoms in the alkyl group and from 0.1% to 5.0% on the composition weight of carboxymethyl dextran derived from native, high molecular weight, microbiologically produced dextran and containing an average of 2.0 to 3.0 carboxymethyl groups per anhydroglucopyranosidic unit of the dextran.

20. The method of cleansing fibrous materials and the like which comprises treating them with an aqueous medium containing, in an amount of about 1 part thereof per 500 parts of water, a detergent-soil suspending composition consisting essentially of a mixture of a synthetic soapless detergent and carboxymethyl dextran in an amount of 0.1% to 5.0% on the combined weights of the detergent and carboxymethyl dextran.

(References on following page)

References Cited in the file of this patent

UNITED STATES PATENTS

| | | |
|---|---|---|
| 2,335,194 | Nusslein | Nov. 23, 1943 |
| 2,609,368 | Gaver | Sept. 2, 1952 |

OTHER REFERENCES

Perry and Schwartz: Surface Active Agents, 1949, page 379.